(12) United States Patent
Shilton

(10) Patent No.: US 6,360,183 B1
(45) Date of Patent: Mar. 19, 2002

(54) DEVICE AND METHOD FOR TRIGGERING A RANDOM EVENT

(75) Inventor: Mark Golder Shilton, Buckinghamshire (GB)

(73) Assignee: Nycomed Amersham PLC, Buckinghamshire (GB)

( * ) Notice: Subject to any disclaimer, the term of this patent is extended or adjusted under 35 U.S.C. 154(b) by 0 days.

(21) Appl. No.: 09/125,274

(22) PCT Filed: Feb. 19, 1997

(86) PCT No.: PCT/GB97/00455

§ 371 Date: Mar. 19, 1999

§ 102(e) Date: Mar. 19, 1999

(87) PCT Pub. No.: WO97/29820

PCT Pub. Date: Aug. 21, 1997

(30) Foreign Application Priority Data

Feb. 19, 1996 (EP) .............................. 96301096

(51) Int. Cl.[7] .............................. A63F 7/02; G01T 1/17; G06F 1/02
(52) U.S. Cl. .................. 702/179; 702/180; 702/181; 702/187; 273/121 B; 708/250; 708/255
(58) Field of Search .................. 702/179, 190, 702/181, 187, 194, 196, 199, 79, 89, 180; 273/121 B; 708/250, 255; 250/366, 369, 328

(56) References Cited

U.S. PATENT DOCUMENTS

| 4,835,703 A | | 5/1989 | Arnold et al. ............... 364/484 |
| 5,796,637 A | * | 8/1998 | Glew et al. .................. 702/190 |
| 5,987,483 A | * | 11/1999 | Edelkind et al. ............ 708/250 |

FOREIGN PATENT DOCUMENTS

| JP | 06 154 411 | 6/1994 |
| JP | 06 291 620 | 10/1994 |

* cited by examiner

*Primary Examiner*—Marc S. Hoff
*Assistant Examiner*—Hien Vo
(74) *Attorney, Agent, or Firm*—Marshall, Gerstein & Borun

(57) ABSTRACT

The device and method for triggering a random event is suited for use as an RPG in a Packinko gaming machine and involves the use of a radioactive source and detector. Repeated measurement of decay events detected by the detector during selected time periods are compared against one another and preferably against a predetermined number and a win event is triggered when the numbers are equal. Appropriate selection of the predetermined number for comparison determines the probability of a win event being triggered. With this device and method materials having very low radioactivity may be used. Also, the device and method operates to trigger a win event at a desired probability without the need for the Mean output of the radioactive material to be measured accurately.

17 Claims, 2 Drawing Sheets

DEVICE AND METHOD FOR TRIGGERING A RANDOM EVENT

TECHNICAL FIELD

The present invention relates to a device and method for triggering a random event. In particular, but not exclusively, the present invention is concerned with a device and method for triggering a random win event suitable for use in a Pachinko gaming machine employing a radioactive random pulse generator.

BACKGROUND

The use of a Radioactive Random Pulse Generator (RPG) in a Pachinko Gaming Machine has been previously described in Japanese Patent Application JP 6-154411. The purpose of the RPG is to randomly trigger a win event when a ball bearing enters a metal "tulip" in the Pachinko machine. According to JP 6-154411 the Pachinko machine measures the output of the RPG for 1 second when a ball enters a metal tulip in the machine. The player wins if the output of the RPG equals a "number" which has been pre-programmed into the machine at the factory.

The probability of a win is fixed at the factory by the Pachinko machine manufacturer to comply with guidelines agreed with the parlours and the police authorities. The odds of a "big win" is typically set to be about 1/220. The output of the RPG is completely random and unpredictable but on average there will be two possible outputs which will occur once every 220 measurements. The Mean RPG output is measured by counting the output of the RPG at the factory for a long time. Poisson or Gaussian probability theory is then used to calculate which of the many possible outputs will have a 1/220 probability of occurring. This output is the "number" which is programmed into the Pachinko machine for triggering the win events.

Although this is an elegant method of triggering random win events with a predetermined probability, there are some practical difficulties with the method. In order to set the win probability to 1/220 within a tolerance of +/−5% it is necessary to carry out particularly accurate measurements of the Mean RPG outputs. The accuracy required for this is about 0. 1%–0.3% of the Mean. This requires long measurement times of up to several hours for each RPG. This is a major practical drawback. The present invention provides an improvement to JP 6-154411 in so far as the measurement time and measurement accuracy of the Mean are concerned.

The radioactive content of the RPG described in JP 6-154411 is ~1 $\mu$Ci. This gives rise to regulatory and safety concerns about the use of this amount of radioactivity in RPG devices. The present invention provides a significant improvement in that the radioactive content can be reduced by at least 100 times and up to 100,000 times. The lower activity content reduces radiation damage and degradation of the sensitive detector and this contributes to superior performance and stability over long periods of operation. For various regulatory, safety and operational reasons it is also highly desirable to minimise the amount of radioactivity required to operate the RPG. Preferably the activity should be <<0.1 $\mu$Ci. This is not possible using the device described in JP 6-154411.

Furthermore, it is an easy matter to select and set any desired win probability at the factory using the present invention. This may be in the range of about 1/5 to 1/1000 which is ideal for gaming applications. Variable win probability over this wide range is not possible using the method described in JP 6-154411.

SUMMARY

The present invention provides a method of triggering random events comprising on a plurality of occasions detecting individual radiation decay events, counting the number of detected events within a predetermined period of time and storing the numbers of events counted; comparing the stored numbers of events; and triggering a random event in dependence on whether at least two of said stored numbers of events are equal.

In one embodiment the counter only determines whether said number of decay events is non-zero whereby said random event is triggered in dependence on both the stored number of events and the one or more new numbers of events being non-zero.

In a further aspect the present invention provides a device for triggering a random event comprising at least one radiation detector, a counter for counting the number of radiation decays detected within a predetermined time interval, comparator means for comparing at least two numbers of decay events detected and an event trigger for triggering a random event in dependence on the at least two numbers of decay events being equal (see FIG. 1).

In a preferred embodiment the device further including at least one source of radiation.

In a third aspect the present invention provides a random win event generator adapted for use with a Pachinko gaming machine comprising a device as described above.

With the present invention the activity content of the device may be <~5 nCi which is below the internationally accepted contamination and leak test limits which apply to the sale and use of sealed radiation sources. Moreover, in comparison to the RPG described in JP 6-154411, the activity content of the device in accordance with the present invention may be reduced by a factor of between about 100 and 100,000 depending on how the Pachinko machine is programmed. The very low activity possible with the present invention reduces the rate of radiation degradation and drift in the long term performance of the PIN diode detector which is contained within the RPG. The very low activity also gives rise to alternative manufacturing and design possibilities for the device as an RPG. In particular, electrical deposition and direct dispensing from standardised $^{241}$Am solutions are possible. These methods provide potential manufacturing advantages.

In addition, when the device and method of the present invention are used in a Pachinko gaming machine in the form of an RPG the degree of accuracy needed in measuring the output of individual RPGs for the purpose of calculating and programming a "fixed number" is reduced. A large tolerance on the RPG output is permissible with the present invention. For example ~9% uncertainty in the Mean RPG output can give as little as ~5% uncertainty in the win probability depending upon the particular type of measurements taken. Even in the worst cases with the present invention the tolerances are no worse than about a quarter of this.

A major advantage of the present invention is that the large tolerance which is permitted on the device output enables all devices to be manufactured so that the same fixed numbers can be programmed whereas the RPG described in JP 6-154411 requires a unique 'fixed number' to be calculated for each RPG by measuring the Mean output of each RPG accurately. With the present invention on the other hand it is only necessary to ensure that the manufacturing process is capable of achieving an overall batch tolerance of +/−9% in the case of the preferred embodiment. This avoids the need to measure the outputs of individual devices or to calculate any specific 'fixed numbers'.

Although a probability 1/220 is given as the desired probability in the forthcoming examples, it will be understood that by appropriate selection of the measurement time interval and the number of repeated measurements taken, any desired probability can be achieved. Moreover, in accordance with the present invention the device for triggering a random event may be programmed so that when input with the desired probability the device automatically determines the appropriate measurement parameters.

BRIEF DESCRIPTION OF THE DRAWINGS

Features and advantages of the disclosed system will be apparent to those of ordinary skill in the art in view of the detailed description of exemplary embodiments which is made with reference to the drawings, a brief description of which is provided below.

DETAILED DESCRIPTION OF THE EXEMPLARY EMBODIMENTS

Figure 1:
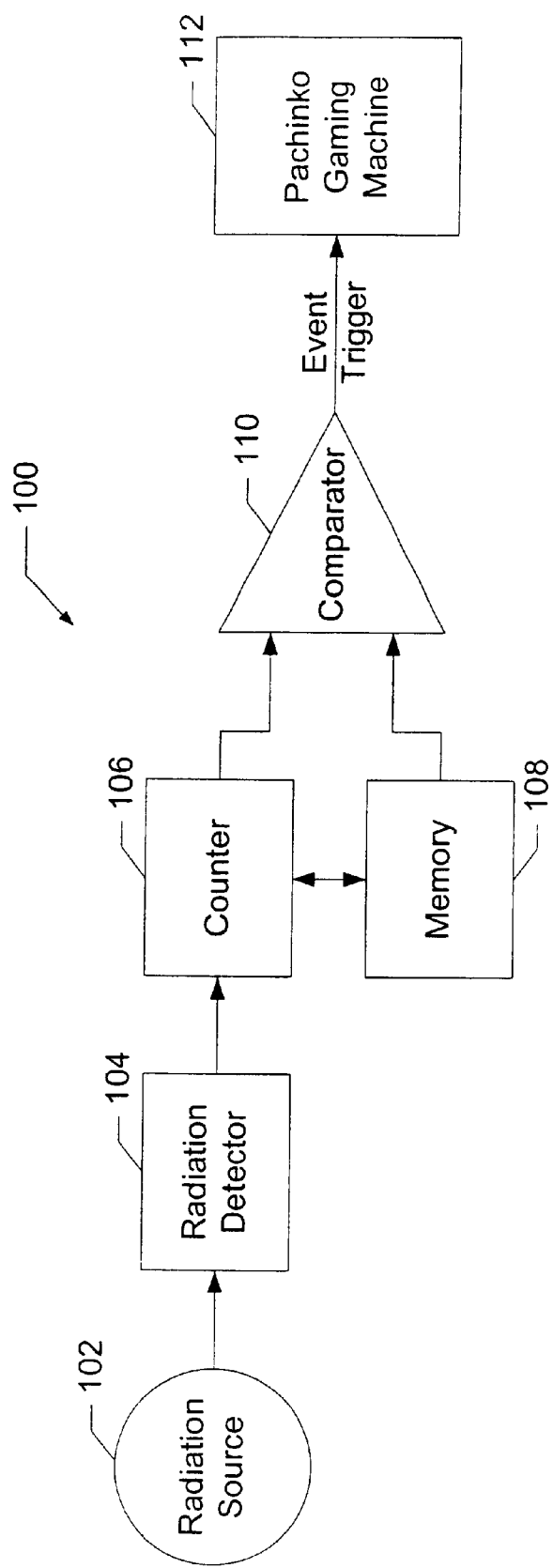
FIG. 1 is a block diagram of a device for triggering a random event.
Figure 2:
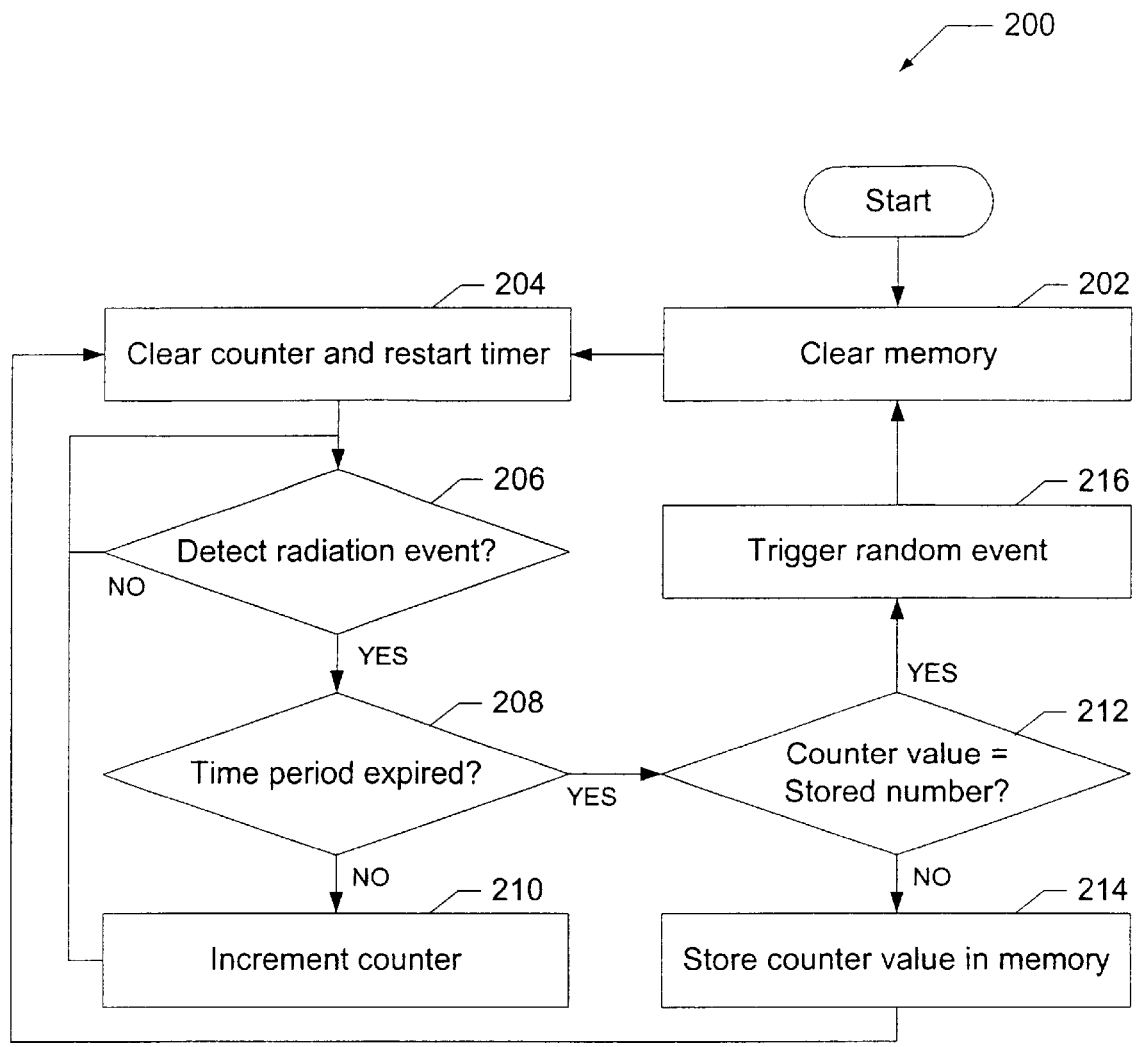
FIG. 2 is a flowchart of a method of triggering random events.

The method of triggering a win with a probability of ~1/220 can be described using the analogy of throwing a die 4 times in succession and triggering a win when a sequence of four equal numbers occur in succession.

The probability of throwing a specified number is 1/6. The probability of throwing this number 4 times in succession is $(1/6)^4$. The probability of throwing any unspecified number 4 times in succession is the sum of the probabilities for all the possible numbers:

$$(P_{total}) = \sum_{n=0}^{n=6} (P_n)^4 = (1/6)^4 \times 6 = 1/216$$

In the case of an RPG, the probability of counting successive, equal RPG outputs depends on the Mean output and the number of repeat measurements. This can be calculated using the Poisson probability distribution function which applies to radioactive decay in a similar way to the above die throwing analogy.

Theory

The probability of the RPG emitting an output of (m) pulses is defined by the Poisson distribution function.

$$^M P_m = M^m \cdot e^{-M}/m! \qquad 1)$$

where:
* (m) is the number of pulses emitted.
* (M) is the mean pulse rate.
* ($^M P_m$) is the probability.

The probability of measuring an output of (m), (n) times in succession is given by:

$$(^M P_m)^n = (M^m \cdot e^{-M}/m!)^n \qquad 3)$$

(This is analogous to throwing a specified number, n times in succession).

The combined probability of measuring all unspecified values of (m), (n) times in succession is the sum of all the individual probabilities for all possible values of (m). This is given by:

$$\sum_{m=0}^{m=m} (^M P_m)^n = \sum_{m=0}^{m=m} [M^m \cdot e^{-M}/m!]^n \qquad 4)$$

(This is analogous to throwing any unspecified number, n times in succession).

By way of example, the probability of measuring 5 equal counts in succession from an RPG with a Mean output of 1.683 pulses per measurement interval is as follows:

$$\sum_{m=0}^{m=m} (^M P_m)^5 = (e^{-1.683})^5 \cdot \sum_{m=0}^{m=m} [1.683^m/m!]^5 \qquad 5)$$

$$= e^{-8.415} \cdot [1 + (1.683/1!)^5 + (1.683^2/2!)^5 + (1.683^3/3!)^5 + (1.683^4/4!)^5 + \ldots]$$

$$= 2.215 \times 10^{-4} \cdot [1 + 13.50 + 5.697 + 0.317 + 0.004 + \ldots]$$

$$= 4.545 \times 10^{-3} = \underline{1/220}$$

$=e^{-8.415}\cdot[1+(1.683/1!)^5+(1.683^2/2!)^5+(1.683^3/3!)^5+(1.683^4/4!)^5+.]=$ $2.215\times10^{-4}\cdot[1+13.50+5.697+0.317+0.004+ \ldots ]=4.545\times10^{-3}=$ $1/220$

EXAMPLE 1

The case of an RPG with a Mean of 1.683 pulses per measurement interval will now be described by way of example.

5 successive, equal counts are required to trigger a win with a probability of 1/220 as shown above. This RPG can therefore be measured with 5×~0.2 second measurements so that the total measurement time is ~1 second. The Mean count rate of such an RPG would be ~5×1.683=~8.41 pulses per second. The radioactive content of such an RPG would be about 0.57 nCi assuming ~40% detection efficiency. (37 disintegrations per second =1 nCi)

A ~0.57 nCi RPG having a Mean output of ~8.41 pulses per second is installed into a Pachinko machine. This is programmed to carry out 5×0.2 second measurements when a ball bearing enters a particular "tulip" within the machine. When this occurs each of the 5 measured outputs are fed into the storage register of the control chip of the Pachinko machine which is programmed to trigger a win when all 5 outputs are equal to each other.

The RPG is manufactured so that the tolerance on the Mean output is within certain agreed limits. For example if the win probability was required to be within 1/220+/−5% the RPG would need to be manufactured with an output tolerance of +/−2.5%.

The above example is only one of several possibilities. There are unique RPG outputs for which 2, 3, 4, 5, 6, . . . etc repeat measurements all give rise to a 1/220 win probability. These have been calculated and are shown in Table 1 below highlighted in bold. In addition several other probabilities have also been calculated for comparison.

The optimum RPG output and the optimum number of repeat measurements is a compromise between minimising the activity content for regulatory and environmental reasons and minimising the uncertainty in the win probability due to the uncertainty in the manufacturing tolerance of the RPG output.

If the widest possible manufacturing tolerance was desired the optimum case would be for a win to be triggered when 3 successive equal counts occur. This requires the use of an RPG having a Mean output of 61 pulses per second which would contain about 4.12 nCi assuming 40% detection efficiency. In this case a given manufacturing uncertainty in Mean (eg +/−5%) results in the same uncertainty (ie +/−5%) in the win probability.

TABLE 1

Calculated Probabilities using the Poisson Distribution Function

| Mean RPG Output (M) | $\Sigma(^MP_m)^2$ Probability of 2 in succession | $\Sigma(^MP_m)^3$ Probability of 3 in succession | $\Sigma(^MP_m)^4$ Probability of 4 in succession | $\Sigma(^MP_m)^5$ Probability of 5 in succession | $\Sigma(^MP_m)^6$ Probability of 6 in succession |
|---|---|---|---|---|---|
| 1.00 | 1/2.72 | 1/9.43 | 1/26.46 | 1/73 | 1/200 |
| 1.033 | | | | | 1/220 |
| 1.05 | | | | | 1/229 |
| 1.10 | | | | | 1/260 |
| 1.50 | 1/4.26 | 1/15 | 1/51 | 1/173 | |
| 1.65 | | | | 1/211 | |
| 1.683 | | | | 1/220 | |
| 1.70 | | | | 1/225 | |
| 2.00 | 1/4.8 | 1/20 | 1/69 | 1/319 | |
| 3.00 | 1/6.1 | 1/32 | 1/155 | | |
| 3.60 | | | 1/206 | | |
| 3.70 | | | 1/215 | | |
| 3.725 | | | 1/220 | | |
| 3.75 | | | 1/225 | | |
| 4.00 | 1/7.03 | 1/43 | 1/242 | | |
| 6.00 | 1/8.59 | 1/64 | 1/451 | | |
| 10.00 | | 1/108 | | | |
| 20.00 | | 1/216 | | | |
| 20.37 | | 1/220 | | | |

A summary of the results and conclusions from table 1 are as follows:

an RPG with a Mean output of 1.033+/−∼3% counts per measurement interval has a probability of ∼1/220+/−∼10% of measuring 6 equal counts in succession.

an RPG with a Mean output of 1.683+/−∼3% counts per measurement interval has a probability of ∼1/220+/−∼6% of measuring 5 equal counts in succession.

an RPG with a Mean output of 3.725+/−∼3% counts per measurement interval has a probability of ∼1/220+/−∼6% of measuring 4 equal counts in succession.

an RPG with a Mean output of 20.37+/−∼3% counts per measurement interval has a probability of ∼1/220+/−∼3% of measuring 3 equal counts in succession.

A simple empirical relationship between probability (P) and Mean (M) for 3 repeats is approximated by:

$$P = \Sigma(^MP_m)^3 \sim 1/10.8 \, M \, (\text{for } M > \sim 3) \qquad 6)$$

EXAMPLE 2

The case of an RPG with a Mean of 33 pulses per measurement interval will now be described by way of example.

The probability of measuring 2 successive 33's is given by the following equation:

$$(^MP_m)^n = (M^m . e^{-M}/m!)^n = (33^{33} . e^{-33}/33!)^2 = 1/208$$

Any Mean RPG output between 31.23 and 34.83 has a probability of 2 successive 33's between 1/230 and 1/208. For example:

$$(^MP_m)^n = (M^m . e^{-M}/m!)^n = (31.23^{33} . e^{-31.23}/33!)^2 = 1/230$$

Therefore an RPG with a Mean output of 33 (+/−1.77) has a probability of between 1/208–1/230 of measuring 33 twice in succession.

This RPG can therefore be measured with 2×∼0.5 second measurements so that the total measurement time is ∼1 second. The Mean count rate of such an RPG would be ∼2×33=∼66 pulses per second. The radioactive content of such an RPG would be about 4.46 nCi assuming ∼40% detection efficiency. (37 disintegrations per second=1 nCi)

A ∼4.46 nCi RPG having a Mean output of∼66 pulses per second is installed into a Pachinko machine. This is programmed to carry out 2×0.5 second measurements when a ball bearing enters a particular "tulip" within the machine. When this occurs each of the 2 measured outputs are fed into the storage register of the control chip of the Pachinko machine which is programmed to trigger a win when both outputs are equal to the number 33 which has been programmed into the machine at the factory.

The RPG is manufactured so that the tolerance on the Mean output is within certain agreed limits. For example if the win probability was required to be within 1/220+/−5% the RPG would need to be manufactured with an output tolerance of 33+/−5.45%.

Table 2 shows other examples of possible RPG outputs for which 2, 3, 4, 5, 6, . . . etc repeat measurements give rise to a 1/220 win probability. These are highlighted in bold.

The optimum RPG outputs and the optimum number of repeat measurements depends on a number of factors. If the widest possible manufacturing tolerance was desired, the optimum case would be for an RPG with a Mean of 31.23–34.83 pulses per measurement interval.

If low activity was the most important constraint an RPG with a Mean output of 1.575–1.674 pulses per measurement interval could be used. This would require 4×0.25 second repeat measurements to trigger a win with a 1/210–1/230 probability. The activity content of such an RPG would be ∼0.44 nCi assuming 40% detection efficiency.

TABLE 2

Calculated Probabilities using the Poisson Distribution Function

| Mean (M) | Fixed Number (m) | $(^MP_m)^2$ Probability of 2 × m in succession | $(^MP_m)^3$ Probability of 3 × m in succession | $(^MP_m)^4$ Probability of 4 × m in succession | $(^MP_m)^5$ Probability of 5 × m in succession |
|---|---|---|---|---|---|
| 1.420 | 1 | | | | 1/210 |
| 1.451 | 1 | | | | 1/220 |
| 1.479 | 1 | | | | 1/230 |
| 1.575 | 2 | | | 1/230 | |
| 1.620 | 2 | | | 1/220 | |
| 1.674 | 2 | | | 1/210 | |
| 5.68 | 5 | | 1/210 | | |
| 5.80 | 5 | | 1/220 | | |
| 5.90 | 5 | | 1/230 | | |
| 31.23 | 33 | 1/230 | | | |
| 31.66 | 33 | 1/220 | | | |
| 33.00 | 33 | 1/208 | | | |
| 34.35 | 33 | 1/220 | | | |
| 34.83 | 33 | 1/230 | | | |
| 35.55 | 34 | 1/230 | | | |
| 34.92 | 34 | 1/220 | | | |
| 34.00 | 34 | 1/215 | | | |
| 33.08 | 34 | 1/220 | | | |
| 32.49 | 34 | 1/230 | | | |
| 36.20 | 35 | 1/230 | | | |
| 35.00 | 35 | 1/221 | | | |
| 33.83 | 35 | 1/230 | | | |

EXAMPLE 3

The case of an RPG with a Mean of 8.475 pulses per measurement interval will now be described by way of example.

The probability of measuring 3 successive 8's or 3 successive 9's is given by the following equation:

$$({}^M P_8)^3 + ({}^M P_9)^3 = (M^8 \cdot e^{-M}/8!)^3 + (M^8 \cdot e^{-M}/8!)^3$$
$$\text{For } M = 8.475, = (8.475^8 \cdot e^{-8.475}/8!)^3 + (8.475^9 \cdot e^{-8.475}/9!)^3$$
$$= 1/210$$

As can be seen from table 3 any Mean RPG output between 7.70 and 9.25 has a probability of 3 successive 8's or 3 successive 9's between 1/230 and 1/210.

This RPG can therefore be measured with 3×~0.333 second measurements so that the total measurement time is ~1 second. The Mean count rate of such an RPG would be ~3×8.475=~25.4 pulses per second. The radioactive content of such an RPG would be about 1.72 nCi assuming ~40% detection efficiency. (37 disintegrations per second=1 nCi)

A ~1.72 nCi RPG having a Mean output of ~25.4 pulses per second is installed into a Pachinko machine. This is programmed to carry out 3×0.333 second measurements when a ball bearing enters a particular "tulip"within the machine. When this occurs each of the 3 measured outputs are fed into the storage register of the control chip of the Pachinko machine which is programmed to trigger a win when all three outputs are equal to either the number 8 or the number 9 which have been programmed into the machine at the factory.

The RPG is manufactured so that the tolerance on the Mean output is within certain agreed limits. For example if the win probability was required to be within 1/220+/−5% the RPG would need to be manufactured with an output tolerance of +/−9.16%.

Table 3 shows other examples of possible RPG outputs for which 2, 3, 4 . . . etc repeat measurements give rise to a 1/220 win probability. These are highlighted in bold.

The optimum RPG outputs and the optimum number of repeat measurements depends on a number of factors. If the widest possible manufacturing tolerance was desired, the optimum case would be for an RPG with a Mean of 8.475 pulses per measurement interval.

complex and may mitigate against programming more than about 2 fixed numbers into the machine.

Usually there will be a small choice of numbers which could be programmed into the Pachinko machine to achieve a probability which is sufficiently close to a desired value. For example, a win probability close to 1/220 could be achieved in several different ways as follows:

| pragramme | number of successive counts | maximum win probability | Mean RPG Output |
|---|---|---|---|
| 8, or 10, or 11 | 3 | 1/201 | 9.49 |
| 8 or 9 | 3 | 1/209 | 8.48 |
| 10, or 11, or 12 | 3 | 1/212 | 10.9 |
| 7, or 9 | 3 | 1/214 | 7.85 |
| 6, or 9 | 3 | 1/220 | 6.35 |

In some circumstances there may be limited programming options to achieve a particular desired win probability. For example, there is only one way of achieving a win probability which is close to 1/800. This is by programming a win to be triggered when 6, or 7, or 8 are measured 4 times either simultaneously or in succession with a Mean RPG output of ~6.75 pulses per measurement.

But, the method of successive counting does enable virtually any probability value between 1/5–1/1000 to be achieved within +/−5% percent by programming combinations of one, two or three numbers between 1 and 13 and appropriate selection of the measurement time interval.

Furthermore the win probability can be easily varied in the factory using any RPG. All that is required is that the programmed numbers and the number of successive counts are changed to achieve the desired maximum probability. The measurement time is then simply adjusted so that the Mean output per measurement is correct.

TABLE 3

Calculated Probabilities using the Poisson Distribution Function

| Mean (M) | Fixed Numbers ($m_1$) | Fixed Numbers ($m_2$) | $({}^M P_{m1})^2 + ({}^M P_{m2})^2$ Probability of 2 × ($m_1$ or $m_2$) in succession | $({}^M P_{m1})^3 + ({}^M P_{m2})^3$ Probability of 3 × ($m_1$ or $m_2$) in succession | $({}^M P_{m1})^4 + ({}^M P_{m2})^4$ Probability of 4 × ($m_1$ or $m_2$) in succession |
|---|---|---|---|---|---|
| 3.082 | 2 | 3 | | | 1/210 |
| 3.145 | 2 | 3 | | | 1/220 |
| 3.202 | 2 | 3 | | | 1/230 |
| 7.700 | 8 | 9 | | 1/230 | |
| 7.894 | 8 | 9 | | 1/220 | |
| 8.475 | 8 | 9 | | 1/210 | |
| 9.037 | 8 | 9 | | 1/220 | |
| 9.252 | 8 | 9 | | 1/230 | |
| 43.90 | 52 | 44 | 1/230 | | |
| 44.70 | 52 | 44 | 1/220 | | |
| 48.10 | 52 | 44 | 1/210 | | |
| 49.86 | 52 | 44 | 1/220 | | |
| 50.84 | 52 | 44 | 1/230 | | |

EXAMPLE 4

The examples given above can be extended so that a win is triggered when successive counts equal 3 or more numbers which are programmed into the Pachinko machine. There may be some advantages in doing this if a wider manufacturing tolerance can be achieved, however the programming and control requirements become increasingly

EXAMPLE 5

The case of an RPG with a Mean of 0.0698 pulses per measurement interval will now be described by way of example.

The probability of measuring a zero, n times in succession is given by the following equation:

$$({}^M P_0)^n = (M^0 \cdot e^{-M}/0!)^n = (e^{-M})^n$$

The probability of measuring something other than zero, n times in succession is therefore:

$$(1-{}^M P_0)^n = (1-e^{-M})^n$$

In the case of an RPG with a Mean output of 0.0698 the probability of measuring something twice in succession is:

$$(1-{}^{0.0698} P_0)^2 = (1-e^{-0.0698})^2 = 1/220$$

An RPG with a Mean output of 0.0715–0.0682 (ie 0.0698+/−2.37%) has a probability of between 1/210–1/230 of measuring something twice in succession.

This RPG can therefore be measured with 2×~0.5 second measurements so that the total measurement time is ~1 second. The Mean count rate of such an RPG would be ~2×0.0698=~0.1396 pulses per second. The radioactive content of such an RPG would be about 9.4 pCi (pico curie) assuming ~40% detection efficiency. (0.037 disintegrations per second=1 pCi)

A ~9.4 pCi+/−2.36% RPG having a Mean output of ~0.1396 pulses per second is installed into a Pachinko machine. This is programmed to carry out 2×0.5 second measurements when a ball bearing enters a particular "tulip" within the machine. When this occurs each of the 2 measured outputs are fed into the storage register of the control chip of the Pachinko machine which is programmed to trigger a win when both outputs are non zero.

The RPG is manufactured so that the tolerance on the Mean output is within certain agreed limits. For example if the win probability was required to be within 1/220+/−5% the RPG would need to be manufactured with an output tolerance of +/−2.36%.

In order to avoid any potential problems which may be caused by the very low activity content of the RPG the option of choosing a much shorter measurement interval can be considered. For example the activity content can be increased from 0.94 pCi to 0.94 nCi by reducing the measurement interval from 0.5 seconds to 0.5 milliseconds or using an inefficient detector or poor detection geometry.

Table 4 shows other examples of possible RPG outputs for which 2, 3, 4, 5, 6, . . . etc repeat measurements give rise to a 1/220 win probability. These are highlighted in bold.

TABLE 4

Calculated Probabilities using the Poisson Distribution Function

| Mean RPG Output (M) | $(1 - {}^M P_0)^2$ non zero 2 times | $(1 - {}^M P_0)^3$ non zero 3 times | $(1 - {}^M P_0)^4$ non zero 4 times | $(1 - {}^M P_0)^5$ non zero 5 times | $(1 - {}^M P_0)^6$ non zero 6 times |
|---|---|---|---|---|---|
| 0.528 | | | | | 1/210 |
| 0.523 | | | | | 1/220 |
| 0.517 | | | | | 1/230 |
| 0.420 | | | | 1/210 | |
| 0.416 | | | | 1/220 | |
| 0.411 | | | | 1/230 | |
| 0.305 | | | 1/210 | | |
| 0.301 | | | 1/220 | | |
| 0.297 | | | 1/230 | | |
| 0.184 | | 1/210 | | | |
| 0.189 | | 1/220 | | | |
| 0.178 | | 1/230 | | | |
| 0.0715 | 1/210 | | | | |
| 0.0698 | 1/220 | | | | |
| 0.0682 | 1/230 | | | | |

The following experiment was performed in order to examine the validity of the various methods described above.

A low level Cs-137 source was counted in a heavily shielded low background counter for a short time interval. The total number of counts were recorded. This was repeated 597,724 times. The mean count over 597,724 measurements was 8.6381.

Recorded data were analysed to count the number of times particular sequences of numbers occurred. In this experiment representative sequences of '3×8s or 9s' in succession and 'Any 3' in succession where chosen to be counted for the purposes of the analysis. The experimental numbers of occurrences were then compared with the theory. A ratio of Theory/Experiment was obtained for the data set. This gave a measure of how close theory and experiment agreed. A representative page of recorded data is shown in Table 5 from the experiment to illustrate the random occurrence of number sequences. '2×8s or 9s' and 'Any 3' are underlined.

Results for '3×8s or 9s' in succession
The number of '3×8s or 9s' was 2866
The experimental probability was 2866/579724=1/208.56
According to theory the probability is 1/209.82
Statistical uncertainty in the experimental data is +/−3.7% within 2 standard deviations (98% confidence)
Theory/Experiment=0.994+/−0.037
Results for 'Any 3' in succession
The number of 'Any 3' was 6478
The experimental probability was 6478/597724=1/92.27
According to theory the probability is 1/92.78
Statistical uncertainty in the experimental data is +/−2.5% within 2 standard deviations (98% confidence)
Theory/Experiment=0.995+/−0.025

Theoretical probabilities were calculated using the Poisson distribution function.

The probability of measuring an output of (8 or 9), three times in succession is given by:

$$*({}^{8.6381} P_8)^3 + ({}^{8.6381} P_9)^3 = (8.6381^8 \cdot e^{-8.6381}/8!)^3 + (8.6381^9 \cdot e^{-8.6381}/9!)^3 = 1/209.82$$

The probability of measuring all unspecified values of (m), three times in succession is the sum of all the individual probabilities for all possible values of (m). This is given by:

$$* \sum_{m=0}^{m=m} ({}^{8.6381} P_m)^3 = \sum_{m=0}^{m=m} [8.6381^m \cdot e^{-8.6381}/m!]^3 = 1/92.78$$

Although reference has been made above to the use of the random event trigger in a Pachinko gaming machine, it will of course be understood that the random event trigger may be used in any circumstances where there is a need for events to be triggered randomly at a predetermined probability for example in message encryption and statistical quality control.

Also, the random event trigger and the method of triggering a random event has been described with reference to the use of a radioactive source, however, it will be apparent from an understanding of the theory that background radiation may alternatively be employed in which case the device for triggering random events comprises a detector of background radiation, a counter device for determining the number of events in a predetermined time interval and processing means for determining whether the number of events detected triggers a random event. It will also be appreciated that the numbers of events to be compared may be counted successively or alternative where a plurality of detectors and radiation sources are available, the number of events can be counted simultaneously.

TABLE 5

| Channel Number | Number of Measured Counts | | | | | | | |
|---|---|---|---|---|---|---|---|---|
| 2888 | 13 | 10 | 4 | 10 | 7 | 9 | 7 | 6 |
| 2896 | 9 | 6 | 7 | 10 | 9 | 9 | 7 | 11 |
| 2904 | 9 | 13 | 3 | 8 | 5 | 13 | 13 | 6 |
| 2912 | 14 | 9 | 10 | 14 | 10 | 15 | 16 | 6 |
| 2920 | 9 | 8 | 9 | 5 | 9 | 8 | 9 | 3 |
| 2928 | 6 | 9 | 11 | 12 | 7 | 9 | 10 | _6_ |
| 2936 | _6_ | _6_ | 9 | 10 | 11 | 11 | 8 | 11 |
| 2944 | 6 | 9 | 12 | 8 | 5 | 9 | 5 | 9 |
| 2952 | 8 | 9 | 16 | 5 | 8 | 7 | 5 | 9 |
| 2960 | 7 | 9 | 7 | 15 | 7 | 9 | 6 | 12 |
| 2968 | 8 | 8 | 7 | 6 | 13 | 9 | 9 | 11 |
| 2976 | 11 | 7 | 6 | 8 | 6 | 8 | 10 | 9 |
| 2984 | 12 | 11 | 7 | 12 | 11 | 5 | 6 | 9 |
| 2992 | 6 | 12 | 6 | 7 | 6 | 7 | 13 | 12 |
| 3000 | 12 | 10 | 10 | 11 | 8 | 11 | 9 | 10 |
| 3008 | 10 | 9 | 13 | 12 | 8 | 10 | 16 | 8 |
| 3016 | _9_ | _9_ | _9_ | 13 | 10 | 7 | 8 | 11 |
| 3024 | 10 | 7 | 13 | 3 | 11 | 7 | 9 | 10 |
| 3032 | 8 | 8 | 11 | 9 | 5 | 9 | 9 | 10 |
| 3040 | 8 | 9 | 6 | 7 | 6 | 10 | 10 | 8 |
| 3048 | 9 | 8 | 9 | 6 | 10 | 10 | 4 | 11 |
| 3056 | 5 | _9_ | _9_ | _9_ | 7 | 11 | 8 | 7 |
| 3064 | 5 | 6 | 5 | 7 | 8 | 10 | 13 | 8 |
| 3072 | 9 | 8 | 9 | 6 | 7 | 3 | 16 | 7 |
| 3080 | 10 | 7 | 7 | 9 | 10 | 8 | 3 | 6 |
| 3088 | 5 | 5 | 13 | 5 | 11 | 9 | 12 | 3 |
| 3096 | 10 | 9 | 10 | 9 | 10 | 6 | 4 | 12 |
| 3104 | 9 | 10 | 11 | 9 | 7 | 5 | 10 | 4 |
| 3112 | 8 | 11 | 7 | 14 | 13 | 10 | 9 | 13 |
| 3120 | 8 | 12 | 10 | 9 | 8 | 9 | 12 | 13 |
| 3128 | 9 | 7 | 14 | 10 | 8 | 6 | 12 | 5 |
| 3136 | 8 | 9 | 4 | 9 | _8_ | _8_ | _8_ | 6 |
| 3144 | 10 | 4 | 8 | 14 | 9 | 8 | 9 | 13 |
| 3152 | 10 | 9 | 13 | 11 | 7 | 7 | 11 | 6 |
| 3160 | 7 | 9 | 8 | 12 | 6 | 7 | 12 | 10 |
| 3168 | 13 | 10 | 5 | 6 | 6 | 7 | 11 | 11 |
| 3176 | 16 | 5 | 7 | 8 | 6 | 9 | 9 | 7 |
| 3184 | 5 | 3 | 10 | 8 | 11 | 12 | 2 | 12 |
| 3192 | 12 | 11 | 7 | 4 | 10 | _7_ | _7_ | _7_ |
| 3200 | 8 | 9 | 9 | 12 | 9 | 6 | 7 | 7 ← |
| 3208 | 5 | 5 | 6 | 15 | 6 | 8 | 12 | 6 |
| 3216 | 9 | 11 | 15 | 8 | 9 | 6 | 5 | 11 |
| 3224 | 7 | 10 | 16 | 7 | 9 | 10 | 5 | 16 |
| 3232 | 7 | 12 | 7 | 6 | 7 | 6 | 12 | 7 |
| 3240 | 9 | 4 | 9 | 4 | 10 | 9 | 9 | 11 |
| 3248 | 11 | 15 | 12 | 9 | 6 | 8 | 11 | 9 |
| 3256 | 9 | 12 | 8 | 5 | 7 | 1 | 8 | 8 |
| 3264 | 8 | 10 | 7 | 8 | 3 | 12 | 10 | 11 |
| 3272 | 10 | 10 | 11 | 5 | 4 | 6 | 5 | 6 |
| 3280 | 7 | 8 | 13 | 13 | 7 | 8 | 10 | 5 |
| 3288 | 12 | 6 | 3 | 11 | 12 | 9 | 8 | 13 |
| 3296 | 15 | 9 | 7 | 11 | 16 | 9 | 6 | 5 |
| 3304 | 7 | 10 | 6 | 9 | 13 | 8 | 5 | 9 |
| 3312 | 10 | 6 | 6 | 5 | _7_ | _7_ | _7_ | 10 |
| 3320 | 8 | 12 | 11 | 10 | 13 | 4 | 13 | 10 |
| 3328 | 12 | 12 | 8 | 12 | 10 | 6 | 8 | 3 |
| 3336 | 9 | 11 | 10 | 13 | 7 | 6 | 4 | 5 |
| 3344 | 7 | 11 | 4 | 13 | 12 | 12 | 11 | 11 |
| 3352 | 5 | 10 | 7 | 11 | 10 | 9 | 6 | 6 |
| 3360 | 10 | 11 | 10 | 7 | 6 | 6 | 13 | 10 |
| 3368 | 7 | 13 | 7 | 8 | 7 | 10 | 7 | 13 |
| 3376 | 13 | 9 | 7 | 6 | 10 | _8_ | _8_ | _8_ |
| 3384 | 8 | 11 | 7 | 11 | 8 | 8 | 6 | 5 |

What is claimed is:

1. A method of triggering random events comprising:
   detecting a plurality of radiation decay events, the plurality of radiation decay events including a first number of detected events and a second number of detected events;
   counting the first number of detected events within a first predetermined period of time;
   counting the second number of detected events within a second predetermined period of time;
   comparing the first number of detected events to the second number of detected events to determine if the first number of detected events is equal to the second number of detected events; and
   triggering a random event if the first number of detected events and the second number of detected events are equal.

2. A method as claimed in claim 1, wherein said method further includes comparing the first number of detected events with a predetermined number, said random event being triggered if the first number of detected events is equal to said predetermined number.

3. A method as claimed in claim 2, wherein said first number of detected events is compared with a plurality of predetermined numbers and said random event is triggered if said first number of detected events is equal to one of said plurality of predetermined numbers.

4. A method as claimed in claim 1, wherein said random event is triggered if the first number of detected events is non-zero and the second number of detected events is non-zero.

5. A method as claimed in claim 1, wherein the detection step determines background radiation decay.

6. A method as defined in claim 1, wherein the random event is associated with a Pachinko gaming machine.

7. A method as claimed in claim 2, wherein the predetermined number is adjustable to vary a probability of winning.

8. A method as claimed in claim 1, wherein said first number of detected events are counted simultaneously with counting said second number of detected events.

9. A method as claimed in claim 1 wherein said second number of detected events are counted after counting said first number of detected events.

10. Device for triggering a random event comprising:
    a radiation detector,
    a counter for counting a number of radiation decays detected within a predetermined time interval;
    a comparator for comparing at least two numbers of decay events detected; and
    an event trigger signal for triggering a random event if at least two numbers of decay events are equal.

11. A device as claimed in claim 10, wherein there is further provided a memory containing one or more predetermined numbers, whereby a random event is triggered by said event trigger signal when the at least two numbers of decay events are equal to one of the predetermined numbers.

12. A device as claimed in claim 10, wherein said counter is arrange to determine whether said number of decay events is non-zero.

13. A device as claimed in claim 10 further including at least one source of radiation.

14. A device as claimed in claim 13, wherein the Mean radiation decay event output of the source of radiation is in the range 0.06–100 decay events per predetermined period of time.

15. A device as claimed in claim 14, wherein the Mean output is approximately 8.5 decay events per predetermined period of time and said predetermined numbers are 8 and 9.

16. A device as claimed in claim 10, wherein said predetermined period of time is equal to a fraction of a number of different counts made of decay events in 1 second.

17. A random win event generator adapted for use with a Pachinko gaming machine comprising a device as claimed in claim 10.

* * * * *

UNITED STATES PATENT AND TRADEMARK OFFICE
CERTIFICATE OF CORRECTION

PATENT NO.    : 6,360,183 B1
DATED         : March 19, 2002
INVENTOR(S)   : Shilton It is certified that error appears in the above-identified patent and that said Letters Patent is hereby corrected as shown below:

Column 12,
Line 49, please delete "arrange" and insert in its place -- arranged --.

Signed and Sealed this

Eleventh Day of March, 2003

JAMES E. ROGAN
*Director of the United States Patent and Trademark Office*